United States Patent
Imfeld

(10) Patent No.: US 10,770,938 B2
(45) Date of Patent: Sep. 8, 2020

(54) ELECTRONICALLY COMMUTATED ELECTRIC MOTOR WITH TWO ROTOR CORES

(71) Applicant: LAKEVIEW INNOVATION LTD., Buochs (CH)

(72) Inventor: Stefan Imfeld, Giswil (CH)

(73) Assignee: LAKEVIEW INNOVATION LTD., Buochs (CH)

( * ) Notice: Subject to any disclaimer, the term of this patent is extended or adjusted under 35 U.S.C. 154(b) by 95 days.

(21) Appl. No.: 15/679,752

(22) Filed: Aug. 17, 2017

(65) Prior Publication Data
US 2018/0062464 A1 Mar. 1, 2018

(30) Foreign Application Priority Data

Aug. 23, 2016 (EP) .................................... 16001851

(51) Int. Cl.
*H02K 1/27* (2006.01)
*H02K 1/28* (2006.01)
(Continued)

(52) U.S. Cl.
CPC ............. *H02K 1/2773* (2013.01); *H02K 1/28* (2013.01); *H02K 29/08* (2013.01); *H02K 11/215* (2016.01)

(58) Field of Classification Search
CPC ...... H02K 11/215; H02K 1/2773; H02K 1/28; H02K 29/08
See application file for complete search history.

(56) References Cited

U.S. PATENT DOCUMENTS

| 5,325,005 A | 6/1994 | Denk |
| 2006/0010881 A1 | 5/2006 | Hauger et al. |

(Continued)

FOREIGN PATENT DOCUMENTS

| DE | 9017972 U1 * | 7/1993 | ............ A47J 43/085 |
| DE | 10 2007 037 901 A1 | 2/2009 | |

(Continued)

OTHER PUBLICATIONS

Extended European Search Report dated Apr. 3, 2017, issued by the European Patent Office in the corresponding European Patent Application No. 16001851.1-1806. (12 pages).

(Continued)

*Primary Examiner* — Thienvu V Tran
*Assistant Examiner* — Bart Iliya
(74) *Attorney, Agent, or Firm* — Buchanan Ingersoll & Rooney PC

(57) ABSTRACT

An electronically commutated electric motor is disclosed with a stator, a rotor rotatably mounted relative to the stator, and at least one sensor for scanning a magnetic field that co-rotates with the rotor, where the stator includes a stator winding and a magnetically soft stator core, where the rotor includes several permanent magnets arranged distributed in the circumferential direction of the rotor as well as a first magnetically soft rotor core for the permanent magnets, and where the permanent magnets, together with the first magnetically soft rotor core, generate a rotor magnetic field which, for operating the electric motor, interacts with the stator magnetic field of the stator generated by the stator winding and the stator core. A second magnetically soft rotor core adjoins the first magnetically soft rotor core in the axial direction of the rotor. A non-magnetic separator element is arranged in the axial direction, where the permanent magnets extend over the first magnetically soft rotor core, the (Continued)

Figure 1:
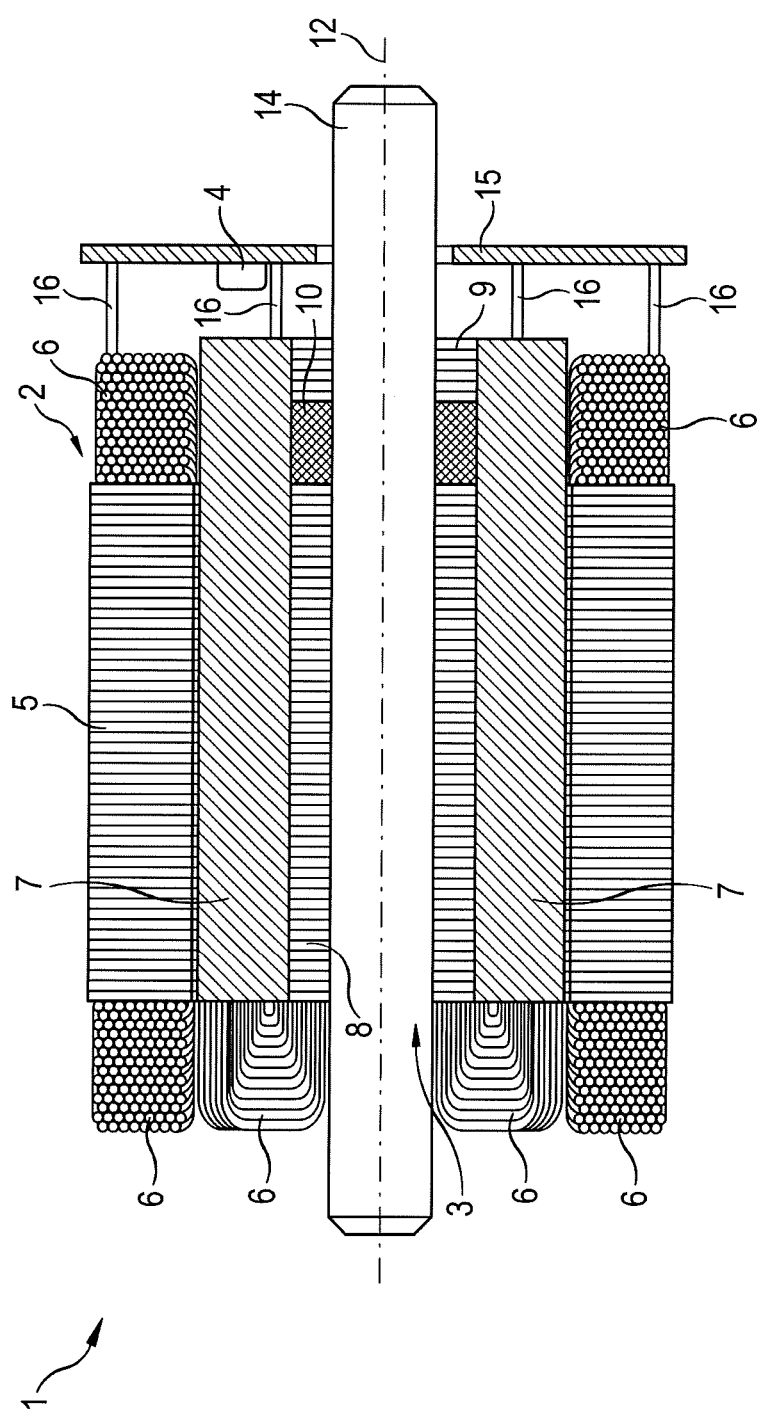

non-magnetic separator element and the second magnetically soft rotor core.

20 Claims, 4 Drawing Sheets

(51) Int. Cl.
*H02K 29/08* (2006.01)
*H02K 11/215* (2016.01)

(56) References Cited

U.S. PATENT DOCUMENTS

| | | | | |
|---|---|---|---|---|
| 2014/0239748 A1* | 8/2014 | Herz | ............... | H02K 1/28 310/43 |
| 2015/0028710 A1* | 1/2015 | Oka | ............... | H02K 15/03 310/156.48 |
| 2015/0236558 A1* | 8/2015 | Oketani | ............... | H02K 1/28 310/43 |
| 2015/0318747 A1 | 11/2015 | Kamiyoshihara et al. | | |
| 2017/0141628 A1* | 5/2017 | Nose | ............... | B21D 28/26 |
| 2018/0091008 A1* | 3/2018 | Oikawa | ............... | H02K 29/08 |

FOREIGN PATENT DOCUMENTS

| | | |
|---|---|---|
| EP | 1 670 121 A1 | 6/2006 |
| JP | 2001-186744 A | 7/2001 |

OTHER PUBLICATIONS

Notice on the First Office Action dated Mar. 4, 2019, by the China National Intellectual Property Administration in corresponding Chinese Patent Application No. 201710725827.2, with English translation. (19 pages).

* cited by examiner

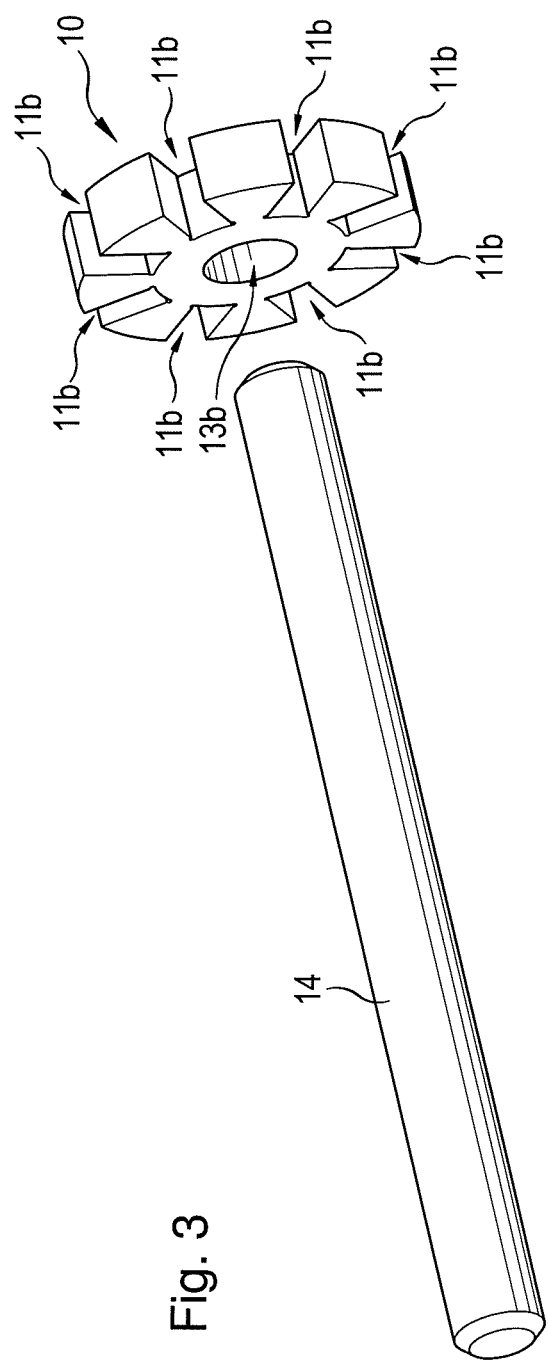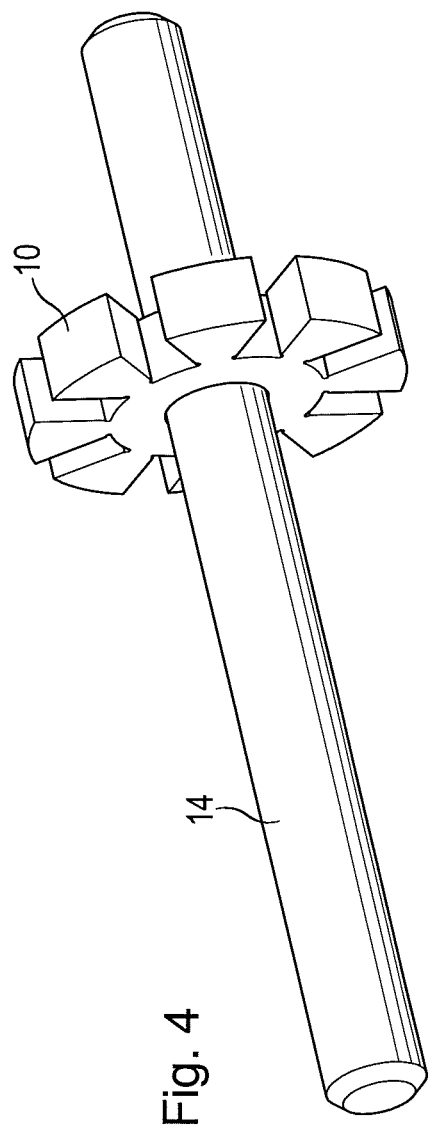

ELECTRONICALLY COMMUTATED ELECTRIC MOTOR WITH TWO ROTOR CORES

The present invention relates to an electronically commutated electric motor according to the preamble of independent claim 1.

An electronically commutated electric motor of the generic type comprises a stator, a rotor rotatably mounted relative to the stator, and at least one sensor for scanning a magnetic field that co-rotates with the rotor. The sensor delivers the signal for the commutation electronics. The stator comprises a stator winding and a magnetically soft stator core. The rotor comprises several permanent magnets arranged distributed in the circumferential direction of the rotor as well as a first magnetically soft rotor core for the permanent magnets. The rotor magnetic field, which for operating the electric motor interacts with a stator magnetic field of the stator generated by the stator winding and stator core, is generated by the permanent magnets and the first magnetically soft rotor core.

Electronically commutated electric motors of the generic type are known from prior art. The sensor, which delivers the signal for the commutation electronics, is generally positioned on one of the two face sides of the rotor. Due to the structural conditions, there is usually a certain spacing between the rotor and the sensor. In most generic electric motors, an additional control magnet is attached to the rotor which generates the magnetic field that is scanned by the sensor, in order to be able to reliably detect the position or rotational speed of the rotor, respectively. This control magnet is advantageously located directly on one of the two face sides of the rotor. The provision of an additional control magnet is generally associated with increased costs and an additional manufacturing effort. However, there are also electric motors in which the rotor magnetic field is scanned directly. For this purpose, the sensor must be positioned very close to the face side end of the rotor, which is not always easy to implement due to structural conditions.

It is an object of the present invention to provide an electronically commutated electric motor of the type mentioned at the outset, in which the position of the rotor or its speed, respectively, can be reliably detected, where the electronically commutated electric motor is to be of a simple design and inexpensive to manufacture. The invention is intended, in particular, for small electric motors with an outer diameter of less than 60 mm.

The object is satisfied by the features of independent claim 1. According thereto, a solution according to the invention is provided in an electronically commutated electric motor according to the invention where the rotor further comprises a second magnetically soft rotor core which adjoins the first magnetically soft rotor core in the axial direction of the rotor, where a non-magnetic separator element is arranged in the axial direction between the first magnetically soft rotor core and the second magnetically soft rotor core, where the permanent magnets extend in the axial direction over the first magnetically soft rotor core, the non-magnetic separator element and the second magnetically soft rotor core, and where the magnetic field scanned by the sensor is a control magnetic field generated by the permanent magnets together with the second magnetically soft rotor core.

The solution according to the invention offers the advantage above all that a reliably detectable control magnetic field is generated without any additional control magnet needing to be employed which would be associated with increased costs and an additional manufacturing effort. Due to the second magnetically soft rotor core, the control magnetic field can there be taken close to the sensor, even with relatively large distances of the sensor to the first magnetically soft rotor core. The second magnetically soft rotor core can advantageously protrude in the axial direction over the magnetically soft stator core. It is prevented with the non-magnetic separator element that forces are created acting in the axial direction on the rotor due to the unsymmetrical position of the entire rotor group, which there arises relative to the axial direction.

The permanent magnets are formed integrally and are by not divided into sections. They therefore extend substantially over the entire length which arises from the juxtaposition of the two magnetically soft rotor cores and the non-magnetic separator element located therebetween. The permanent magnets are preferably accommodated in recesses formed in the two rotor cores and the separator element. The recesses can preferably be continuous longitudinal grooves in the outer circumference of the relevant components. The arrangement of the permanent magnets is preferably spoke-shaped. The two rotor cores and the non-magnetic separator element preferably have substantially the same cross-section. Further preferably, the rotor is an internal rotor. The first magnetically soft rotor core is then arranged radially within the stator core. The stator core can be formed to be grooved, where the coils of the stator winding are received in the grooves of the stator core. Alternatively, the stator core can also be formed by an external back iron of an ironless hollow-cylindrical and self-supporting stator winding. In order to ensure an at least approximately existing spatial separation between the rotor magnetic field and the control magnetic field, the thickness of the non-magnetic separator element measured in the axial direction is at least 10% of the outer diameter of the rotor.

Further advantageous embodiments of the present invention are the subject matter of the dependent claims.

In one particularly preferred embodiment of the present invention, the second magnetically soft rotor core is arranged in the axial direction outside the magnetically soft stator core. Firstly, this ensures that the control magnetic field is made to be close to the sensor. Secondly, this avoids or reduces interaction of the control magnetic field with the stator magnetic field, so that no unwanted magnetically generated forces are generated. The first magnetically soft rotor core is preferably arranged in the same position in the axial direction as the magnetically soft stator core. Most preferably, the first magnetically soft rotor core and the magnetically soft stator core have the same axial length, so that the first magnetically soft rotor core and the magnetically soft stator core are superimposable when viewed in the axial direction. If the first magnetically soft rotor core is somewhat shorter or longer than the magnetically soft stator core, then "in the same position in the axial direction" previously mentioned is to be understood in the context of the present application such that the same distance or projection of the first magnetically soft rotor core relative to the respective face side of the stator core is given at both axial ends.

In a further preferred embodiment of the present invention, the second magnetically soft rotor core terminates substantially with winding heads of the stator winding in the axial direction. As a result, a particularly reliable, scannable control magnetic field is ensured while maintaining the most compact design.

According to a further particularly preferred embodiment of the present invention, the non-magnetic separator element is a plastic disk. This results in the fact that the non-magnetic separator element can be manufactured in a particularly simple and inexpensive manner.

According to a further particularly preferred embodiment of the present invention, the first magnetically soft rotor core, the second magnetically soft rotor core, and the non-magnetic separator element exhibit substantially the same cross-sectional geometry. This not only simplifies assembly. The production of the two magnetically soft rotor cores is also considerably simplified, since the same tools can be used in both cases.

According to a further particularly preferred embodiment of the present invention, the permanent magnets are received in grooves formed in the first magnetically soft rotor core, the second magnetically soft rotor core, and the non-magnetic separator element. In this case, the grooves are preferably continuous and thereby extend equally through all three of the components mentioned. The grooves are simple to manufacture and ensure easy assembly and a reliable fit of the permanent magnets. Alternatively, the permanent magnets can also be inserted into through-bores, which likewise extend over the two magnetically soft rotor cores and the non-magnetic separator element arranged therebetween Further preferably, a central bore is formed in the two magnetically soft rotor cores and the non-magnetic separator element for receiving a shaft of the rotor.

According to a further preferred embodiment of the present invention, the first magnetically soft rotor core and the second magnetically soft rotor core are each composed of magnetically soft punched and stacked metal sheets insulated on both sides. The metal sheets can be mechanically linked to each other, laser-packaged or adhesive-packaged. The same metal sheets can be used for the first magnetically soft rotor core and the second magnetically soft rotor core so that the production of the electric motor according to the invention is simplified and is therefore particularly inexpensive.

According to a further preferred embodiment of the present invention, the rotor has a 4-pole, 8-pole, 10-pole, 14-pole or 16-pole design.

According to a further preferred embodiment of the present invention, the permanent magnets are magnetized in the tangential direction of the rotor.

According to a further preferred embodiment of the present invention, the at least one sensor for scanning the control magnetic field is a Hall sensor, where the Hall sensor is arranged on a side of a printed circuit board facing the second magnetically soft rotor core in the axial direction. In order to increase the accuracy of the scan, it is, of course, also possible to provide several Hall sensors. They are further preferably arranged distributed over the circumference.

According to a further preferred embodiment of the present invention, the electric motor is a small electric motor having a diameter of less than 60 mm.

The present invention also provides a method for manufacturing the rotor of the electronically commutated electric motor of the present invention. According to the invention, the rotor comprises a shaft, onto which, in a first step, the non-magnetic separator element provided with a center through-bore is slipped. Subsequently, the first magnetically soft rotor core and the second magnetically soft rotor core, also having corresponding center through-bores, are slipped onto the shaft. In a next step, the permanent magnets are inserted into corresponding recesses of the first and the second magnetically soft rotor cores as well as of the non-magnetic separator element. The rotor is then cast with an anaerobic potting compound or with adhesive. The method ensures simple and inexpensive manufacture.

Figure 2:
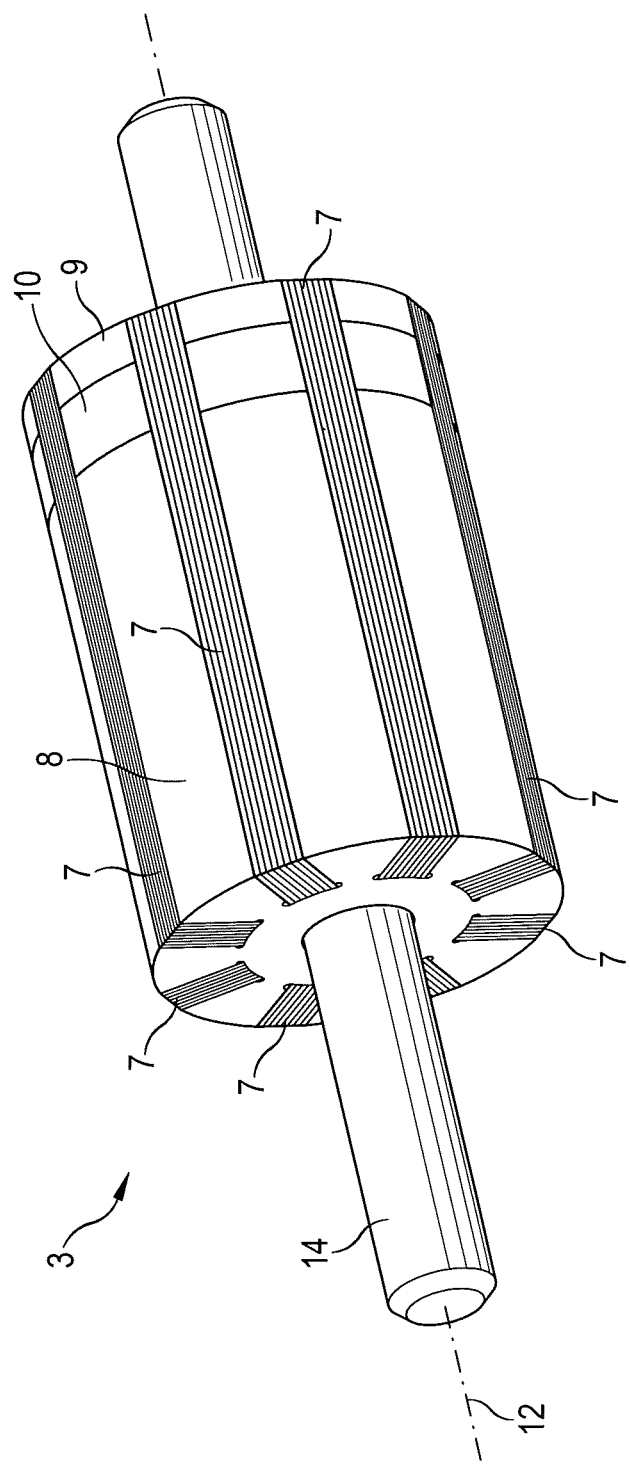
Figure 5:
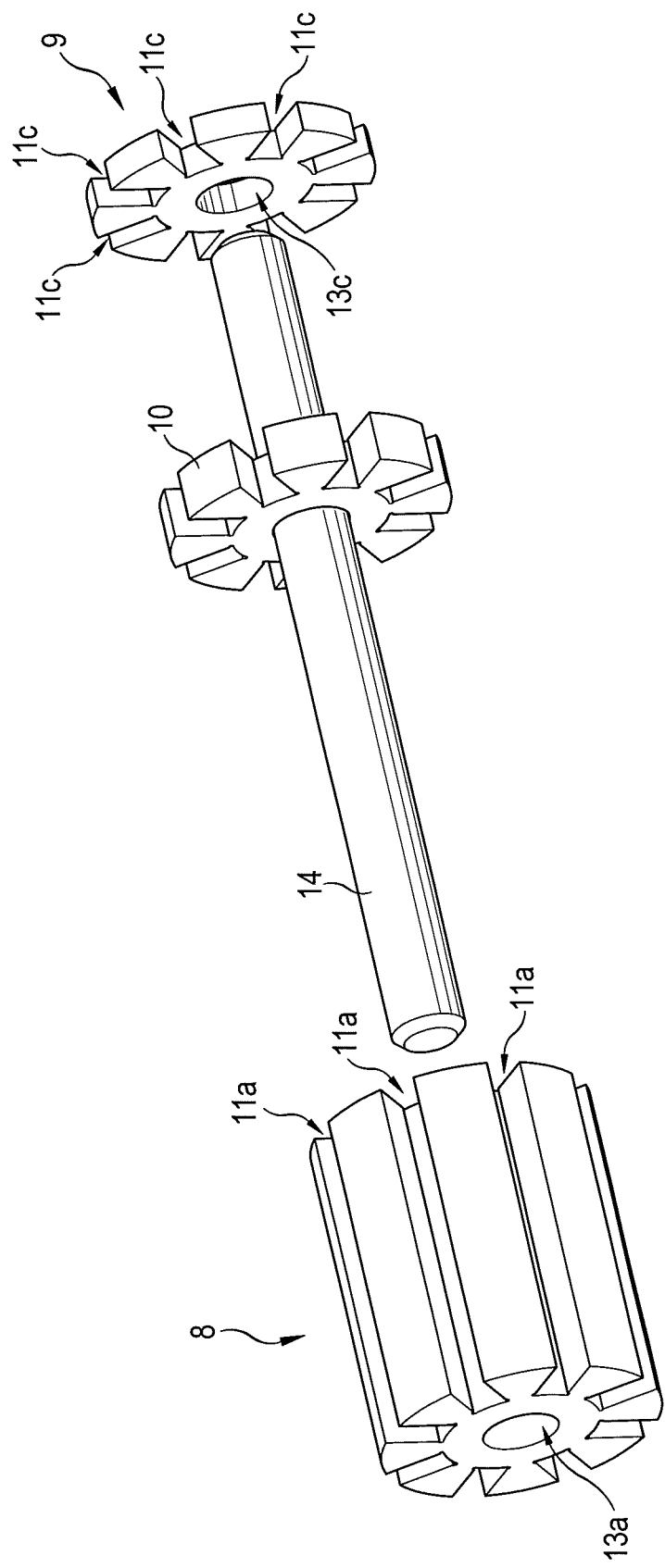

An embodiment of the present invention is explained in more detail below with reference to drawings, where FIG. 1 shows a longitudinal section of an electronically commutated electric motor according to the invention, FIG. 2 shows the rotor of the electronically commutated electric motor according to the invention from FIG. 1 in an inclined view, FIG. 3 shows a first method step for manufacturing the rotor from FIG. 2, in which the non-magnetic separator element of the rotor assembly is slipped onto the shaft of the rotor, FIG. 4 shows the shaft from FIG. 3 with the non-magnetic separator element positioned thereon, and FIG. 5 shows a further method step for manufacturing the rotor from FIG. 2, in which the first magnetically soft rotor core and the second magnetically soft rotor core are slipped onto the shaft.

It applies to the following embodiments that like parts are designated by like reference numerals. Where a figure contains reference numerals which are not explained in more detail in the accompanying figure description, then reference is made to preceding or subsequent figure descriptions.

FIG. 1 shows a schematic longitudinal section through an electronically commutated electric motor 1 according to the invention. The electric motor comprises an external hollow-cylindrical stator 2, a rotor 3 designed as an internal rotor, and a sensor 4 for detecting the rotational position or speed of the rotor, respectively. Stator 2 is a grooved stator. It comprises a magnetically soft stator core 5 as well as several coils inserted into corresponding grooves of the stator core. The coils together form the stator winding of the stator. Only winding heads 6 of the coils are shown in the figure. The coils are connected to the commutation electronics via winding connections 16. The commutation electronics is accommodated on a printed circuit board 15 which is arranged at the right hand end of the rotor perpendicular to symmetry axis 12 of the electric motor. Also sensor 4 for detecting the rotational position of the rotor is disposed on the side of the printed circuit board facing the right face end of the rotor The sensor is a Hall sensor. It is indicated again at this point that, for the purpose of improving scanning accuracy, several sensors can, of course, be provided.

The drawings are merely schematic in nature. For example, the housing of the electric motor is not shown in FIG. 1.

FIG. 2 shows rotor 3 of the electric motor according to the invention from FIG. 1 in more detail. The rotor comprises an end-to-end shaft 14, a first rotor core 8, a second rotor core 9, and several permanent magnets 7 arranged distributed over the circumference. Permanent magnets 7 are designed as rod magnets and are inserted into corresponding grooves which are formed on the outer circumference of the two magnetically soft rotor cores and extend over the entire length of the two magnetically soft rotor cores. The permanent magnets are arranged in a spoke-like manner and are magnetized in the tangential direction of the rotor. A non-magnetic separator element 10 in the form of a plastic disk is arranged between first rotor core 8 and second rotor core 9. The two rotor cores are insulated against each other by way of the separator element. Both the magnetically soft rotor cores 8 and 9 as well as the non-magnetic separator element exhibit substantially the same cross-section. This means that separator element 10 is also provided with corresponding grooves on the outer circumference in which the permanent magnets 7 are received.

FIG. 1 shows that first magnetically soft rotor core 8 has the same length as exterior soft magnet magnetic stator core 5. First magnetically soft rotor core 8 and magnetically soft stator core 5 are additionally arranged superimposable, so that they terminate both at the left and at the right at the same position in the axial direction. Permanent magnets 7 together with first magnetically soft rotor core 8 generate the rotor magnetic field which, for operating the electric motor, interacts with the stator magnetic field of the stator generated by the stator winding and stator core 5. FIG. 1 further shows that second magnetically soft rotor core 9 projects in the axial direction over the right-hand end of magnetically soft stator core 5 and substantially terminates with winding heads 6 of the stator winding. Permanent magnets 7, together with second magnetically soft rotor core 9, generate a control magnetic field which is scanned by sensor 4. Non-magnetic separator element 10 ensures that the control magnetic field hardly interacts with the stator magnetic field, and therefore no undesired forces are generated in the axial direction.

The method for producing the rotor of the electric motor according to the invention is explained below with reference to FIGS. 3 to 5. As shown in FIG. 3, non-magnetic separator element 10 is first slipped onto shaft 14 of the rotor. For this purpose, separator element 10 comprises an end-to-end central bore 13*b*. FIG. 4 shows shaft 14 from FIG. 3 with separator element 10 positioned thereon. In a next step, first magnetically soft rotor core 8 and second magnetically soft rotor core 9 are slipped onto the two ends of the rotor shaft. The two magnetically soft rotor cores likewise each have a central through-bore 13*a* or 13*c*, respectively, for this purpose As is evident from FIGS. 3 and 5, both the two magnetically soft rotor cores 8 and 9 as well as non-magnetic separator element 10 comprise grooves 11*a*, 11*b*, 11*c* which transition seamlessly into one another in the axial direction Finally, elongate permanent magnets 7 are inserted into these grooves, as already shown in FIG. 2. The rotor assembly is then cast with an anaerobic potting compound or with adhesive.

The invention claimed is:

1. Electronically commutated electric motor comprising:
a stator, a rotor rotatably mounted relative to said stator; and
at least one sensor for scanning a magnetic field that co-rotates with said rotor, where said stator includes a stator winding and a magnetically soft stator core, where said rotor includes, several permanent magnets arranged distributed in the circumferential direction of said rotor as well as a first magnetically soft rotor core for said permanent magnets, and where said permanent magnets, together with said first magnetically soft rotor core, are configured to generate a rotor magnetic field which, for operating said electric motor, will interact with the stator magnetic field of said stator when generated by said stator winding and said stator core, wherein said rotor has a second magnetically soft rotor core which adjoins said first magnetically soft rotor core in the axial direction of said rotor, where a non-magnetic separator element is arranged in the axial direction between said first magnetically soft rotor core and said second magnetically soft rotor core, the thickness of the non-magnetic separator element measured in the axial direction of said rotor is at least 10% of the outer diameter of the rotor, where said permanent magnets extend in the axial direction over said first magnetically soft rotor core, said non-magnetic separator element and said second magnetically soft rotor core, and where the magnetic field scanned by said sensor will be generated as a control magnetic field by said permanent magnets together with said second magnetically soft rotor core, wherein said at least one sensor faces an axial face end of the second magnetically soft rotor core.

2. Electronically commutated electric motor according to claim 1, wherein said second magnetically soft rotor core is arranged in the axial direction outside said magnetically soft stator core.

3. Electronically commutated electric motor according to claim 2, wherein said first magnetically soft rotor core is arranged in the axial direction a same position as said magnetically soft stator core.

4. Electronically commutated electric motor according to claim 3, wherein said first magnetically soft rotor core and said magnetically soft stator core have a same axial length.

5. Electronically commutated electric motor according to claim 4, wherein said second magnetically soft rotor core terminates substantially with winding heads of said stator winding in the axial direction.

6. Electronically commutated electric motor according to claim 5, wherein said non-magnetic separator element is a plastic disk.

7. Electronically commutated electric motor according to claim 6, wherein said first magnetically soft rotor core, said second magnetically soft rotor core, and said non-magnetic separator element exhibit substantially the same cross-sectional geometry.

8. Electronically commutated electric motor claim 7, wherein said permanent magnets are received in grooves formed in said first magnetically soft rotor core, said second magnetically soft rotor core, and said non-magnetic separator element.

9. Electronically commutated electric motor claim 8, wherein said first magnetically soft rotor core and said second magnetically soft rotor core are each composed of magnetically soft, punched and stacked metal sheets insulated on both sides.

10. Electronically commutated electric motor according to claim 7, wherein said first magnetically soft rotor core and said second magnetically soft rotor core are each composed of magnetically soft, punched and stacked metal sheets insulated on both sides.

11. Electronically commutated electric motor according to claim 2, wherein said second magnetically soft rotor core terminates substantially with winding heads of said stator winding in the axial direction.

12. Electronically commutated electric motor according to claim 1, wherein said non-magnetic separator element is a plastic disk.

13. Electronically commutated electric motor according to claim 1, wherein said first magnetically soft rotor core, said second magnetically soft rotor core, and said non-magnetic separator element exhibit substantially the same cross-sectional geometry.

14. Electronically commutated electric motor according to claim 1, wherein said permanent magnets are received in grooves formed in said first magnetically soft rotor core, said second magnetically soft rotor core, and said non-magnetic separator element.

15. Electronically commutated electric motor according to claim 1, wherein said first magnetically soft rotor core and said second magnetically soft rotor core are each composed of magnetically soft, punched and stacked metal sheets insulated on both sides.

16. Electronically commutated electric motor according to claim 1, wherein said rotor has a 4-pole, 8-pole, 10-pole, 14-pole or 16-pole design.

17. Electronically commutated electric motor according to claim 1, wherein said permanent magnets are magnetized in the tangential direction of said rotor.

18. Electronically commutated electric motor according to claim 1, wherein said at least one sensor for scanning the control magnetic field is a Hall sensor, where said Hall sensor is arranged on a side of a printed circuit board facing said second magnetically soft rotor core in the axial direction.

19. Electronically commutated electric motor according to claim 1, wherein said electric motor is a small electric motor having a diameter of less than 60 mm.

20. Method for manufacturing a rotor for an electronically commutated electric motor, the electric motor having a stator where the rotor is rotatably mounted relative to said stator, and at least one sensor for scanning a magnetic field that co-rotates with said rotor, where said stator includes a stator winding and a magnetically soft stator core, and said rotor includes, several permanent magnets arranged distributed in the circumferential direction of said rotor as well as a first magnetically soft rotor core for said permanent magnets, wherein said rotor has a second magnetically soft rotor core which adjoins said first magnetically soft rotor core in the axial direction of said rotor, wherein a non-magnetic separator element is arranged in the axial direction between said first magnetically soft rotor core and said second magnetically soft rotor core, and wherein the thickness of the non-magnetic separator element measured in the axial direction of said rotor is at least 10% of the outer diameter of the rotor, wherein said at least one sensor faces an axial face end of the second magnetically soft rotor core the method comprising:
- providing said rotor has a shaft onto which, in a first step, said non-magnetic separator element provided with a center through-bore is slipped;
- subsequently, said first magnetically soft rotor core and said second magnetically soft rotor core, also having corresponding center through-bores, are slipped onto said shaft;
- inserting said permanent magnets into corresponding recesses of said first and said second magnetically soft rotor cores and of a non-magnetic separator element, and casting said rotor with an anaerobic potting compound or with adhesive.

* * * * *